United States Patent
Johnson et al.

[15] 3,648,409
[45] Mar. 14, 1972

[54] HERBICIDE RESISTANT SEED CARRIERS AND PROCESS FOR MANUFACTURE THEREOF

[72] Inventors: Paul E. Johnson; Clarence G. Haugh; George F. Warren, all of W. Lafayette, Ind.; Bernard A. Kratky, Sullivan, Wis.

[73] Assignee: Purdue Research Foundation
[22] Filed: Dec. 9, 1969
[21] Appl. No.: 883,483

[52] U.S. Cl. ............................................................47/57.6
[51] Int. Cl. ...........................................................A01c 1/06
[58] Field of Search ................47/1.9, 57.6, DIG. 9, DIG. 10, 47/58, 56; 71/DIG. 1, 1, 27

[56] References Cited

UNITED STATES PATENTS

| | | | |
|---|---|---|---|
| 2,988,441 | 6/1961 | Pruitt | 71/27 |
| 3,561,159 | 2/1971 | Adams | 47/57.6 |
| 2,671,985 | 3/1954 | Vogelsang | 47/57.6 |
| 2,909,869 | 10/1959 | Dresser | 47/58 |
| 3,077,700 | 2/1963 | Tukacs | 47/1 |
| 3,168,796 | 2/1965 | Scott et al. | 47/1 |
| 3,341,318 | 9/1967 | Chilton | 47/9 X |

FOREIGN PATENTS OR APPLICATIONS

| | | | |
|---|---|---|---|
| 599,445 | 3/1948 | Great Britain | 47/58 |
| 617,040 | 1/1949 | Great Britain | 47/56 |

Primary Examiner—Robert E. Bagwill
Attorney—John R. Nesbitt

[57] ABSTRACT

Localized deposit of activated carbon-vermiculite mixture around seeds gives significant protection against certain pre-emergent herbicides. The mixture can be compressed in tablet form with a liquid fertilizer binder, or incorporated in water soluble mats, and permits precision field seeding with good protection from pre-emergence application of herbicides.

1 Claims, 12 Drawing Figures

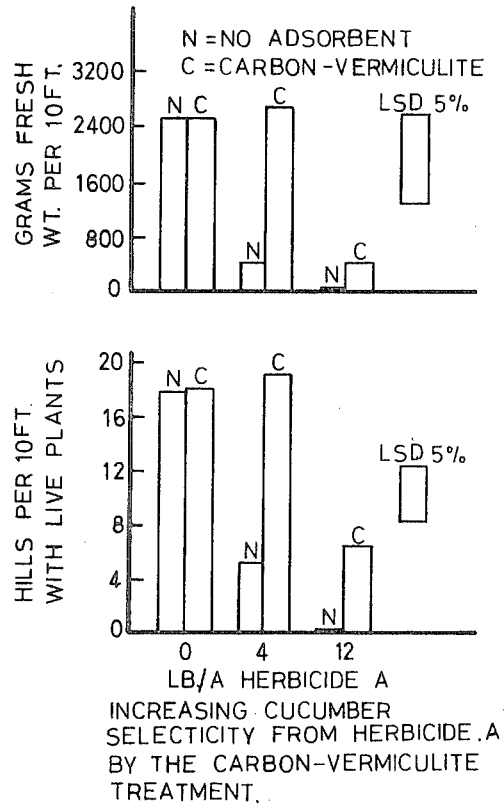

FIG. 1
INCREASING CUCUMBER SELECTICITY FROM HERBICIDE A BY THE CARBON-VERMICULITE TREATMENT.

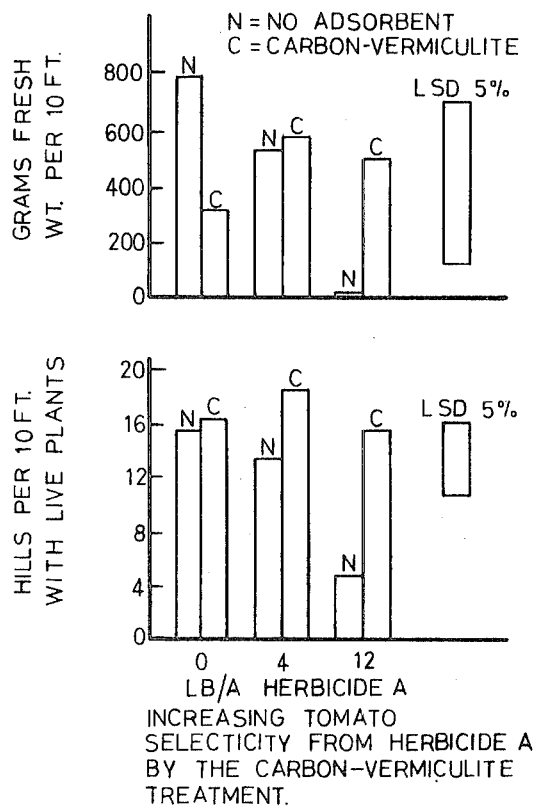

FIG. 2
INCREASING TOMATO SELECTICITY FROM HERBICIDE A BY THE CARBON-VERMICULITE TREATMENT.

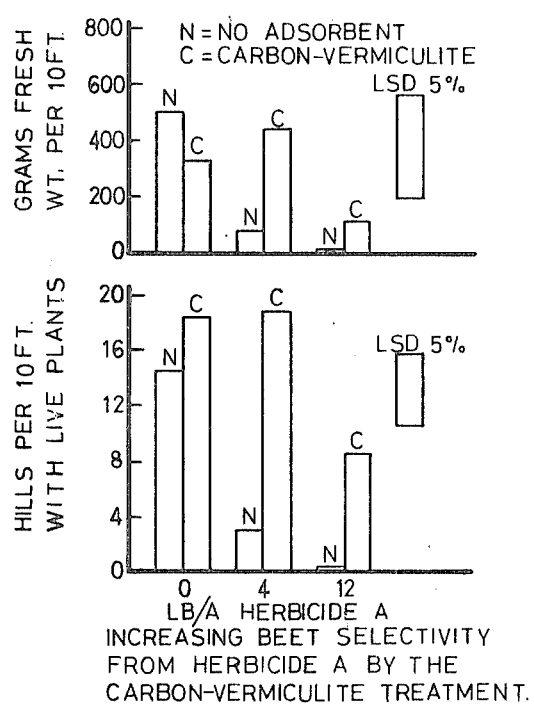

FIG. 3
INCREASING BEET SELECTIVITY FROM HERBICIDE A BY THE CARBON-VERMICULITE TREATMENT.

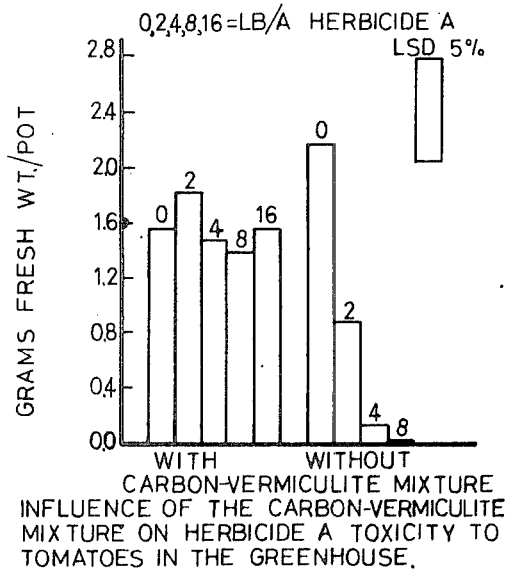

FIG. 4
INFLUENCE OF THE CARBON-VERMICULITE MIXTURE ON HERBICIDE A TOXICITY TO TOMATOES IN THE GREENHOUSE.

INVENTOR.
PAUL E. JOHNSON
CLARENCE G. HAUGH
BY GEORGE F. WARREN
BERNARD A. KRATKY

John R. Nesbitt
ATTORNEY

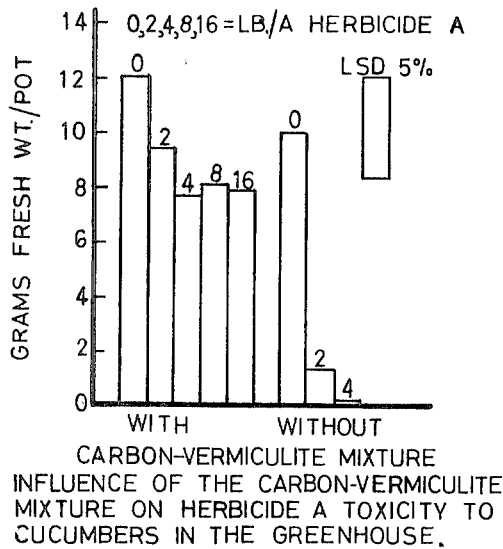

INFLUENCE OF THE CARBON-VERMICULITE MIXTURE ON HERBICIDE A TOXICITY TO CUCUMBERS IN THE GREENHOUSE.

FIG. 5

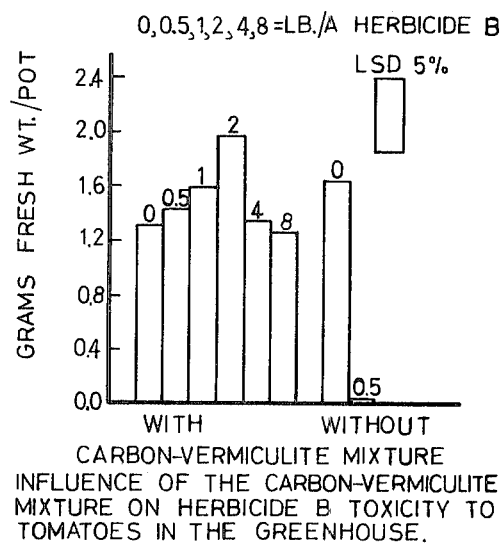

INFLUENCE OF THE CARBON-VERMICULITE MIXTURE ON HERBICIDE B TOXICITY TO TOMATOES IN THE GREENHOUSE.

FIG. 6

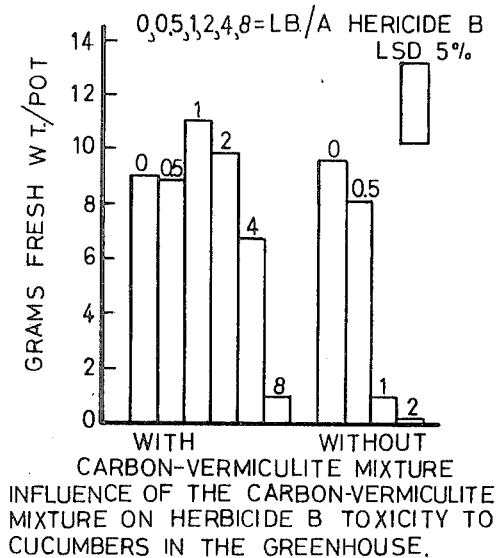

INFLUENCE OF THE CARBON-VERMICULITE MIXTURE ON HERBICIDE B TOXICITY TO CUCUMBERS IN THE GREENHOUSE.

FIG. 7

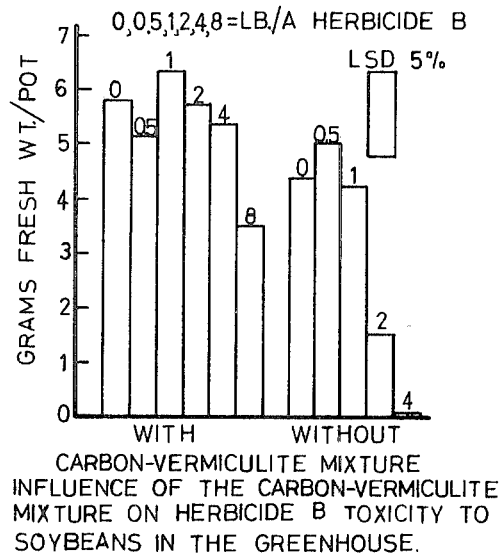

INFLUENCE OF THE CARBON-VERMICULITE MIXTURE ON HERBICIDE B TOXICITY TO SOYBEANS IN THE GREENHOUSE.

FIG. 8

INVENTOR.
PAUL E. JOHNSON
CLARENCE G. HAUGH
BY GEORGE F. WARREN
BERNARD A. KRATKY

ATTORNEY

PROTECTION OF TOMATO SEEDLING FROM HERBICIDE DAMAGE IN ACTIVATED CARBON-VERMICULITE WAFERS.

NUMBER OF HILLS PER PLOT WITH LIVE TOMATO PLANTS 57 DAYS AFTER SEEDING.

HERBICIDE RESISTANT SEED CARRIERS AND PROCESS FOR MANUFACTURE THEREOF

BACKGROUND OF THE INVENTION

Carbon has long been used as an adsorbent for various types of toxic agents. It has previously been used on soils with phytotoxic amounts of various herbicides present.

The inhibition of the crop plants on these soils was greatly reduced because much of the herbicide was adsorbed and no longer was toxic to the crop plants. However, in most cases the herbicide was no longer toxic to the weeds either. In effect, incorporation of carbon into the soil is only important as a method of detoxifying herbicide residues in that soil. Carbon has also been applied in 1-½ ft. bands in herbicide treated soil. Again crop protection was observed, but weed control was not obtained in the 1-½ ft. bands. The end result was a method no more effective in weed control than spraying bands of herbicide between the rows but not over them. Ripper, as reported in *Proceedings of the Third British Weed Control Conference*, British Weed Control Council, 86 Strand, London W.C. 2, (Nov. 6, 7, and 8, 1956), sprayed a 2 in. band of adsorbent over the seed row at a depth midway between the seed (which was 1-½ –2 in. deep) and the soil surface. The crop plants gained selectivity over the herbicides and good weed kill was obtained when the herbicide was applied to the soil surface. However, any system of protection which allows treated soil to contact the shoot zone as that mentioned above by Ripper subjects the plant to possible damage from uptake of the herbicide. Since Ripper's study, others have sprayed narrow bands of carbon over crop rows before herbicide application. Again, protection was noted, but use of this method leads to weeds in the row where the adsorbent band was applied.

Another problem with these carbon bands has been that on soils commonly found in the midwest a high degree of crusting is obtained which often inhibits or prevents seed emergence. These bands are also subject to erosion thereby extending the herbicide protective effects away from the seeds.

Up to the time of this invention no commercially satisfactory solution has existed to protect seeds from pre-emergent herbicide application.

BRIEF SUMMARY OF THE INVENTION

It is an object of this invention to provide a seed protective medium that facilitates emergence of seeds when used in conjunction with a pre-emergent herbicide applied for weed control.

It is another object of the invention to provide a seed carrier that permits precision seeding and which has good herbicide resistance combined with high speed emergence performance.

THE DRAWINGS

FIG. 1 is two bar graphs showing stand counts and fresh weights for given rates of application of Herbicide A for a given cucumber seed group.

FIG. 2 is two bar graphs showing stand counts and fresh weights for given rates of application of Herbicide A for a given tomato seed group.

FIG. 3 is two bar graphs showing stand counts and fresh weights for given rates of application of Herbicide A for a given beet seed group.

FIG. 4 is a bar graph showing influence of the carbon-vermiculite mixture on Herbicide A Toxicity to Tomatoes in the Greenhouse.

FIG. 5 is a bar graph showing influence of carbon-vermiculite mixture on Herbicide A Toxicity to Cucumbers in the Greenhouse.

FIG. 6 is a bar graph showing influence of carbon-vermiculite mixture on Herbicide B Toxicity to Tomatoes in the Greenhouse.

FIG. 7 is a bar graph showing influence of the carbon-vermiculite mixture on Herbicide B to Cucumbers in the Greenhouse.

FIG. 8 is a bar graph showing influence of the carbon-vermiculite mixture on Herbicide B Toxicity to Soybeans in the Greenhouse.

DETAILED DESCRIPTION OF THE INVENTION

Figure 9:
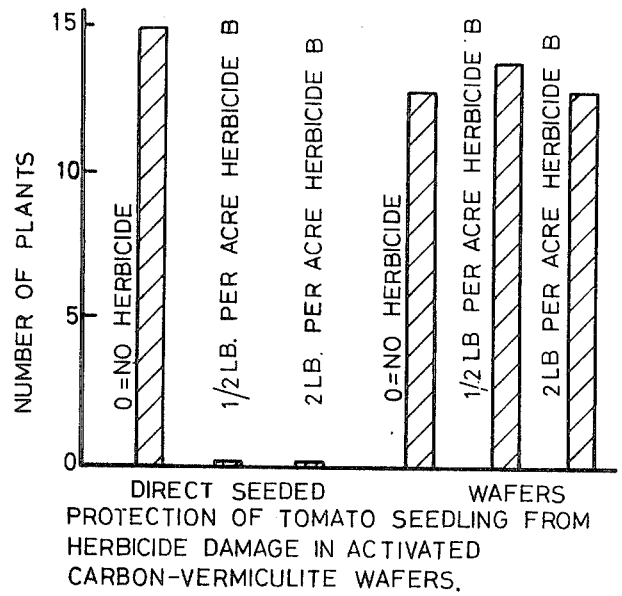
FIG. 9 is two bar graphs showing protection of tomato seedlings from Herbicide B damage in activated carbon-vermiculite wafers.

It has been found that a satisfactory herbicide resistant seed protective medium may be provided by making holes in the soil to be planted, placing seeds at the bottom of such holes and then filling the holes to the level of the soil surface with about 1.7 grams of an activated carbon-vermiculite mixture (these filled holes are sometimes hereafter referred to as "-hills"). The carbon-vermiculite mixture is prepared by thoroughly mixing one pound of activated carbon with three liters of vermiculite. The commercial vermiculite used weighed 156 grams per liter. Of course, any anti-crustant material, either organic, such as sawdust, or inorganic, such as vermiculite, will give satisfactory results.

Tests were conducted and the following six crops were raised: the Hawkeye variety of soybean (*Glycine max L.*), the Bouncer variety of tomato (*Lycopersicum esculentum Mill.*), the Detroit Dark Red variety of beet (*Beta vulgaris L.*), the Harrison variety of barley (*Hordeum vulgare L.*), the Wisconsin SMR-15 variety of cucumber (*Cucumis sativus L.*) and the Greenback YR variety of cabbage (Brassica oleraceae L.). The hills were placed 1 inch apart in rows 10 feet long. The rows were in sets of three, such that they were 10 inches apart and each set of rows was 5 feet apart. Soybeans, tomatoes, and beets composed one set of three rows while cabbage, barley and cucumber composed the other set. 1-butyl-3-(3,4 dichlorphenyl-1-methylurea (hereafter called "Herbicide A") (4 percent granular) was applied on the day of planting at rates of 0, 4, and 12 pound active/Acre both with and without the carbon-vermiculite mixture. Weed counts were taken 22 days after planting. Stand counts with the number of hills having live plants were taken 22 days after planting. Fresh weights were taken after 40 days. A completely random analysis was performed for each crop. There were four replicates of each treatment.

Another field experiment was conducted on the same farm on an Ockly silt loam soil which contained a 1.1 percent organic matter. No herbicides were used on this site the previous year.

A split plot design with four replicates arranged in a randomized complete block was used for each of four crops. The whole units were herbicide treatments and the sub-units were carbon treatments. Two seeds were planted in each hill and the hills were 6 inches apart in 10 foot rows. Soybeans, tomatoes, cucumbers, and barley were the crops planted. A row of the crop without protection was planted 20 inches from a row with the carbon-vermiculite protection. The herbicide rates were 8 pound active/Acre of Herbicide A (4 percent granular), and 2 pound active/Acre (80 percent wettable powder) of 2-chloro -4, 6-bis(ethylamino) - triazine (hereafter called (Herbicide B''), and a no herbicide treatment was included. Weed counts were taken 19 days after planting. The plots were hand weeded after the weed counts were taken. Counts of hills with live plants were made 15 days after planting and fresh weights were taken 48 days after planting.

A greenhouse experiment was conducted to further aid in the determination of the protection afforded by the activated carbon-vermiculite mixture.

Sixteen ounce plastic pots with greenhouse soil were seeded with various crops such that half received the carbon-vermiculite protection as described above and the other half were direct seeded and not protected. Herbicide B (80 percent wettable powder) was applied to cucumbers, soybeans and tomatoes at 0, ½, 1, 2, 4, and 8 pound active/Acre. Herbicide A (4 percent granular) was applied to cucumbers and tomatoes at 0, 2, 4, 8, and 16 pound active/Acre. Four replicates of each herbicide rate with and without the carbon-vermiculite treatment were included. Fresh weights were taken 22 days after planting. A completely random analysis of the data was performed.

Unprotected barley and soybeans were tolerant to 4 and 12 pound/Acre Herbicide A in a field experiment. However, unprotected beets and cucumbers showed significant injury as reflected in stand counts and fresh weights at both rates while tomatoes only showed injury at 12 pound/Acre (FIGS. 1 through 3). The carbon-vermiculite treatment was effective in protection at 4 pound/Acre for beets and cucumbers, but showed a significant decrease in fresh weight at 12 pount/Acre. However, at 12 pound/Acre some yield was obtained, whereas no yield was obtained with the untreated plants. Tomatoes showed protection at 12 pound/Acre. Protection was also observed on cabbage, but insect damage made the results with this crop too variable. Weed control data (Table 1) showed that the carbon-vermiculite treatment resulted in less weed control and this was especially evident at the 4 pound-Acre rate.

This may be attributed to the rain washing the carbon away from the immediate area of the crop plants and desorbing some of the herbicide resulting in protection of the weeds. However, protection of tomatoes at 12 pound/Acre of Herbicide A, with good weed control, vividly demonstrated the compatibility of weed control and crop protection with this method.

In the field experiment where 2 pound/Acre of Herbicide B and 8 pound/Acre of Herbicide A were used on a lighter soil excellent weed control was obtained.

TABLE 2

[Weed control in carbon-vermiculite protection experiment]

| Treatment | | Weeds per square foot 19 days after herbicide application | | | | | | |
|---|---|---|---|---|---|---|---|---|
| Herbicide | Pound/acre | Grass | Lambs-quarter | Carpet-weed | Pig-weed | Velvet-leaf | Jimson-weed | Purslane |
| Check | | 3.59 | 3.03 | 6.35 | 3.14 | 1.11 | .458 | .183 |
| A | 8 | *.28 | *.03 | **.03 | **.18 | **.08 | **.17 | .01 |
| B | 2 | *.00 | *.00 | **.00 | **.00 | **.02 | **.00 | *.00 |

*Significantly different from control at .05 level.
**Significantly different from control at .01 level.

Because this experiment was subject to an overabundance of rain which aided leaching of the herbicides and washing of the activated carbon, the protection method was placed under very severe conditions. Also, the excellent weed control (Table 2) indicated too much herbicide may have been used such that using less herbicide may have resulted in essentially the same weed control while providing more protection. However, the use of the activated carbon-vermiculite treatment resulted in only limited protection (Tables 3 and 4).

TABLE 3

[Number of hills with live plants 40 days after planting]

| Herbicide | Rate. pound/acre | Carbon-vermiculite | Hills/10 foot row with live plants | | | |
|---|---|---|---|---|---|---|
| | | | Soybeans | Tomatoes | Cucumbers | Barley |
| None | 0 | No | 17.25 a | 6.25 ab | 12.50 a | 17.00 a |
| Do | 0 | Yes | 14.75 ab | 7.00 a | 6.00 b | 14.25 ab |
| A | 8 | No | 14.00 ab | 2.75 ab | .00 c | 7.50 bc |
| A | 8 | Yes | 11.50 bc | 4.75 ab | 3.25 bc | 11.75 abc |
| B | 2 | No | .00 d | .00 bc | .00 c | 6.25 c |
| B | 2 | Yes | 9.75 c | .00 bc | 1.50 c | 10.00 abc |

NOTE.—Any two means followed by the same letter(s) are not significantly different at the 5% level according to Duncan's new multiple range test.

TABLE 4

[Fresh weights 48 days after planting]

| Herbicide | Rate pound/acre | Carbon-vermiculite | Grams fresh weight/10 foot row | | | |
|---|---|---|---|---|---|---|
| | | | Soybeans | Tomatoes | Cucumbers | Barley |
| None | 0 | No | 724.24 a | 263.83 a | 2689.95 a | 621.53 a |
| Do | 0 | Yes | 522.10 b | 261.30 a | 1651.43 b | 471.03 ab |
| A | 8 | No | 429.85 bc | 23.75 b | .00 c | 174.38 bc |
| A | 8 | Yes | 403.00 bcd | 107.50 ac | 358.03 c | 380.85 abc |
| B | 2 | No | .00 e | .00 b | .00 c | 131.85 bc |
| B | 2 | Yes | 232.93 d | .00 b | 89.45 c | 222.35 abc |

NOTE.—Any two means followed by the same letter(s) are not significantly different at the 5% level according to Duncan's new multiple range test.

Soybeans were significantly protected from Herbicide B which was especially striking since total inhibition resulted when activated carbon-vermiculite was not applied. Tomatoes showed limited protection when Herbicide A was applied. Cucumbers were not significantly protected, but while Herbicide B and Herbicide A gave total inhibition of the unprotected

TABLE 1

[Weed control in carbon-vermiculite protection experiment against two rates of Herbicide A]

| Treatment | | Weeds per square foot 22 days after herbicide application | | | | | | |
|---|---|---|---|---|---|---|---|---|
| Herbicide A pound/acre | Carbon-vermiculite mixture | Purslane | Pig-weed | Grass | Smart-weed | Velvet-leaf | Lambs-quarter | Carpet-weed |
| 0 | No | 2.13 | 2.35 | 2.75 | .28 | .15 | .50 | 18.78 |
| 0 | Yes | .78 | 2.50 | 2.75 | .33 | .10 | .38 | 27.73 |
| 4 | No | *.05 | **.30 | .73 | .10 | .33 | **.05 | **.73 |
| 4 | Yes | .23 | **1.18 | 2.18 | .45 | .60 | .33 | 13.88 |
| 12 | No | *.00 | **.05 | *.15 | .10 | .03 | **.05 | **.05 |
| 12 | Yes | *.05 | **.20 | *.65 | .05 | .20 | **.15 | **1.03 |

*Significantly different from the control at the .05 level.
**Significantly different from the control at the .01 level.

seedlings the carbon-vermiculite treatment resulted in a small yield. The carbon-vermiculite treatment gave limited protection to barley when both Herbicide A and Herbicide B were applied. While this experiment was not totally successful it demonstrated that protection could be obtained even under severe conditions. Also, it may point out that a definite need exists for a better herbicide for this principle.

A greenhouse experiment apparently presented less severe conditions as evidenced by the protection obtained (FIGS. 4 through 8). Here protection was observed for cucumbers and tomatoes at 16 pound/Acre of Herbicide A with the carbon-vermiculite treatment while 4 pound/Acre gave severe to total inhibition when there was no protection (FIGS. 4 and 5). Herbicide B at 8 pound/Acre did not harm tomatoes with the carbon-vermiculite treatment whereas untreated tomatoes were killed at ½ pound/Acre (FIG. 6). Cucumbers and soybeans were protected well from 4 pound/Acre of Herbicide B with the carbon-vermiculite treatment while complete kill occurred at 2 and 4 pound/Acre respectively when unprotected (FIGS. 7 and 8). The greenhouse data show that protection occurs at herbicide rates where good weed control could be attained. The cost per acre of the activated carbon-vermiculite mixture is reasonable for horticultural crops and season long weed control is possible, this seed protective treatment shows promise for field application. Precision seeding is possible because of more even emergence. Also, the carbon residue in the soil is relatively low which is important because a high residue interferes with weed control in following years by adsorbing the herbicides placed in the soil.

Although the "hill" method described above for protecting seeds from certain pre-emergent herbicides is a satisfactory approach to the problem, another way of realizing the invention is by incorporating the seed and activated carbon-vermiculite in a compressed wafer, preferably using a liquid fertilizer for a binder, one useful finder being of 10–34–0 composition. Various pressures were used in making wafers ranging from 30 to 2,100 p.s.i. Pressures of more than 300 p.s.i. were found to cause decreased seed emergence. The wafers were made, and the pressure applied, in a small cylinder and piston device, in which the loose mixture was placed and the seeds were implanted at the approximate center of the wafer by glass tube. Another method of emplacing the seed is to thoroughly mix the seeds with the carbon-vermiculite binder ingredients, as in a tumbler, for example, and then compress the resulting mixture.

In a greenhouse study wafers were made using only vermiculite and the emergence of tomato seedlings was recorded and the test results are shown in Table 5 as follows:

TABLE 5

Number of Tomato Seedlings from Vermiculite Wafers

| | | | Days After Seeding | | | | |
|---|---|---|---|---|---|---|---|
| Pressure p.s.i. | Vermiculite grams | Thickness | 7 | 8 | 9 | 10 | 11 14 |
| 269 | 1.5 | 0.25 | 0 | 2 | 6 | 10 | 12 14 |
| 99 | 1.5 | 0.50 | 0 | 10 | 15 | 15 | 15 15 |
| 56 | 1.5 | 0.625 | 3 | 14 | 16 | 16 | 16 16 |

Wafers consisting of 1.5 grams of vermiculite were compressed at different pressures to form wafers one-fourth one-half and five-eighths inches thick and three-fourths inch diameter. Liquid fertilizer 10–34–0 at 0.1 ml. per wafer was used as the sole binding agent. Four seeds of Heinz 1,370 were placed in each wafer. The seedings were made in four replicates. From Table 5 it appears that pressures of less than 100 pounds and a wafer one-half to five-eighths inches thick would be optimum. Some difficulty was experienced with binding the large wafers (five-eighths inch), particularly the ones with high activated carbon content, so the ½ inch thick wafer containing 1.5 grams of vermiculite was used in the later trials.

The effect of activated carbon on the emergence of tomato seedlings was investigated and wafers were made using 15 grams to 60 grams of activated carbon per liter of vermiculite. Table 6 shows that with higher rates of activated carbon, plant emergence and growth were delayed.

TABLE 6

The Number of Plants and Fresh Weight of Tomato Seedlings 22 Days After Seeding Activated Carbon-Vermiculate Wafers.

| Activated Carbon per liter Vermiculate grams | Pressure p.s.i. | Thickness inches | Number of Plants Emerged | Fresh Weight grams |
|---|---|---|---|---|
| 15 | 81 | ½ | 13 | 18.2 |
| 30 | 111 | ½ | 12 | 16.7 |
| 60 | 127 | ½ | 4 | 0.4 |
| Control (Conventional Seeding) | | | 15 | 20.7 |

It appears that 15 grams of activated carbon per liter of vermiculite is optimum. It was also noted that where carbon was used the seedlings emerged earlier.

Tomato seeds in activated carbon-vermiculate wafers were seeded in four replicates using Heinz 1,370 seeds and 15 grams of activated carbon per liter of vermiculite. These seedlings were made in soil with different rates of Herbicide B plus a control seeding. From FIG. 9, ½ pound of Herbicide B per acre destroyed all the tomato seedlings without activated carbon for protection. With the activated carbon wafers the tomato seedlings were given protection at an application of 2 pound per acre of Herbicide B.

Similar wafers as above were made and seeded in the field at the Purdue O'Neal farm in a silt loam soil. The herbicides used were Herbicide B, 4-bis(isopropylamino) -6 -(methylthio) -s - triazine, (hereafter called "Herbicide C"), and 3 -amino -2, 5- dichlorobenzoic acid, (hereafter called "Herbicide D"). The wafers were seeded 11 hills per plot in four replicates (1 hill = 1 wafer). Four seeds of Heniz 1,370 were used in each wafer. Table 7 indicates a very definite increased emergence of the seed wafers compared to the conventional direct seeding.

TABLE 7

Increase in Emergence of Tomato Seedlings with the Wafer vs. Conventional Direct Seeding in the Field Without Herbicide.

| | Days after Seeding | | | | |
|---|---|---|---|---|---|
| Treatment | 10 | 12 | 15 | 21 | 31 |
| | NUMBER OF HILLS WITH EMERGED PLANTS | | | | |
| Conventional Direct | 0.75 | 1.0 | 1.25 | 3.0 | 3.0 |
| Seeded Wafer | 1.0 | 4.75 | 6.0 | 6.25 | 6.75 |

Figure 10:
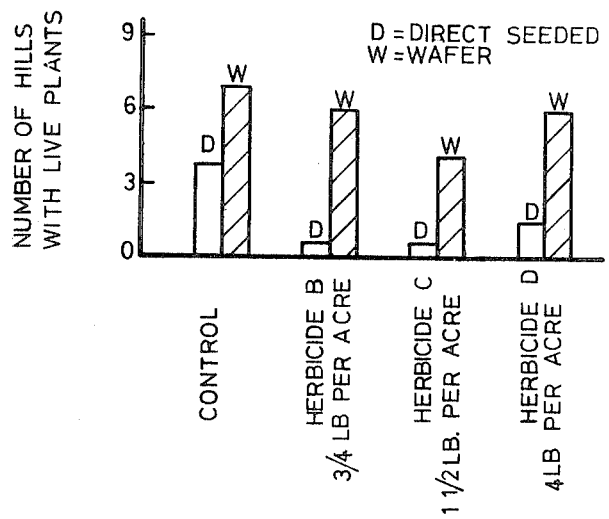
FIG. 10 is a bar graph showing number of hills per plot with live tomato plants 57 days after planting.

FIG. 10 shows the comparison of the above seedings and herbicides by number of hills.

Seed wafers are prepared with two cucumber seeds, variety Wisconsin SMR-15, starter fertilizer, 15 grams activated carbon per liter of vermiculite. These wafers were seeded at the Purdue O'Neal farm in a sandy loam soil with the herbicides, 4 - (methylsulfonyl) -2, 6- dinitro -N, N - dipropylaniline, (hereafter called "Herbicide E"), and dimethyl tetrachloroterephthalicalate, (hereafter called "Herbicide F").

TABLE 8

Fresh Weight of Cucumber[1] Seedlings as Influenced by Different Herbicides when Conventionally Direct Seeded or Seeded in Wafers.

| Herbicide | Rate pound per acre | Conventionally Seeded -grams | Wafers grams |
|---|---|---|---|
| E | 4 | 270 | 1800 |
| F | 8 | 11 | 1300 |
| None | 0 | 1100 | 1000 |

[1] Variety Wisconsin SMR-15

Table 8 indicates that there is significant protection to cucumber seedlings. The control weights were low due to competition of the plants with weeds.

Four essentials of direct seeded vegetables, precision placement of the seed, application of anticrusting materials, supplying starter fertilizer and protecting of young vegetables seedlings from herbicide damage, can be accomplished in one seeding operation using the wafers.

Seed environment is very important for quick emergence. With seed wafers the seed environment can be controlled. The carbon tends to cause the temperature around the seed to rise which aids emergence. The high phosphorous liquid 10–34–0 fertilizer in direct contact with the seed prevents any delay due to lack of nutrients.

With the seed wafers there is no problem of soil crusting, delaying of emergence.

Activated carbon tends to protect young seedlings from herbicide damage. The degree of herbicide protection depends on the type and rate of herbicide used and the amount of activated carbon incorporated in the wafer. However, with 60 grams or more of activated carbon per liter of vermiculite plant emergence and growth were decreased.

Figure 11:
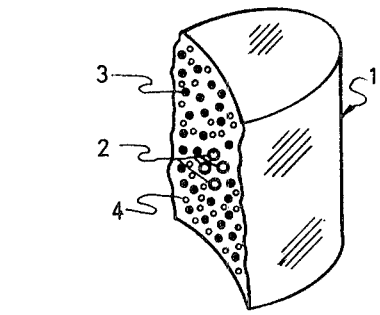
FIG. 11 is a perspective view of a seed protective wafer.

The invention may be practiced as shown in FIG. 11 wherein the compressed tablet 1 has seeds 2 at its approximate center surrounded by compressed activated carbon 3 and vermiculite 4, and all of this is held together by a binder (not shown) which is preferably liquid fertilizer.

Figure 12:
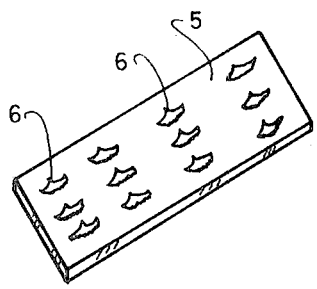
FIG. 12 is a perspective view of a water soluble mat embodying the activated carbon-vermiculite mixture.

Another mode of practicing the invention is shown in FIG. 12 wherein a water-soluble mat 5 is used to encapsulate the activated carbon-vermiculite mixture at 6, and the mixture may be made into tablets before encapsulation, or the tablet step may be omitted, depending on the desired mode of manufacture of the water soluble mat.

We claim:

1. A herbicide-resistant seed wafer comprising at least one seed encased in a mixture of a water-soluble nutrient binder, vermiculite, and activated charcoal, the ratio of vermiculite to charcoal being in a range of from about 5–1 to 10–1 parts by weight, said mixture being compressed about the seed sufficiently to form a cohesive wafer.

* * * * *